(No Model.)
F. LOHR.
ATTACHMENT FOR TROTTING SULKIES.
No. 493,630. Patented Mar. 21, 1893.
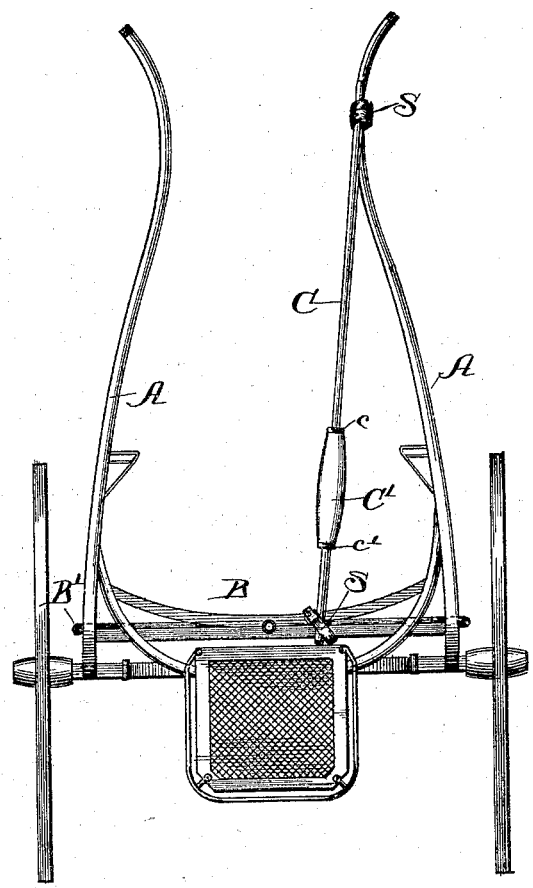

UNITED STATES PATENT OFFICE.

FRANK LOHR, OF FREEPORT, ILLINOIS.

ATTACHMENT FOR TROTTING-SULKIES.

SPECIFICATION forming part of Letters Patent No. 493,630, dated March 21, 1893.

Application filed July 2, 1892. Serial No. 438,758. (No model.)

*To all whom it may concern:*

Be it known that I, FRANK LOHR, a citizen of the United States of America, residing at Freeport, in the county of Stephenson and State of Illinois, have invented certain new and useful Improvements in Attachments for Trotting-Sulkies, of which the following is a specification.

My invention relates to improvements in attachments for trotting sulkies, its object being to provide a cheap, simple and effective device which may be easily attached to, or detached from a sulky of ordinary construction, and when in place shall render it impossible for a horse between the shafts to get out of line of draft of the sulky. It is a well known fact that many trotting horses show a tendency to work in an oblique position with reference to the central line of the sulky, and that this oblique position is objectionable for various reasons. By the use of my invention this tendency is completely overcome, and a horse may be compelled to remain constantly in the central line of the sulky.

The invention is fully described and explained in this specification and shown in the accompanying drawing, which is a top plan of a sulky of ordinary construction provided with my improved attachment.

In the drawing, A, A are the shafts, and B is the cross-bar of a sulky of ordinary construction, the shafts being supported at their rear ends by the axle in the ordinary manner, and the cross-bar being provided with the usual whiffletree B'.

C is a preferably round bar of wood of such length as to reach from a point near the front end of one of the shafts to a point near the center of the cross-bar, and is provided with straps S, S, attached to its ends, or with other suitable means whereby it may be readily fastened to the shaft and cross-bar. Upon the bar C, is mounted an elongated roller C', adapted to turn freely upon the bar and held in place by any suitable means, as for instance, by means of annular bands c, c, of leather, or other suitable material, fastened to the bar. The roller is so placed upon the bar that when the latter is in the working position illustrated in the drawing, and a horse is in working position between the shafts, the roller lies beside the leg of the horse, and lateral movement of the rear end of the body of a horse must bring the leg against the roller. This being the case, it is evident that if the bar and its roller be fastened in position on either side of the center of the sulky, it must effectually prevent the movement of the horse in that direction from his true position; and as any given horse always tends to swing in the same direction from a central line, the device may evidently be so applied as to operate perfectly in each case.

The object of the application of the roller is to prevent friction between the bar and the leg of the horse when the horse swings laterally from his true position, and I have found in practice, that the roller applied substantially as shown, forms an effectual anti-friction device for the purposes mentioned.

Having now described and explained my invention, what I claim as new, and desire to secure by Letters Patent, is—

1. In a sulky attachment of the class described, the combination with a bar adapted to be fastened to the shaft and cross-bar, of an anti-friction roller mounted on the bar in position to impinge upon the leg of a horse when in working position; substantially as shown and described.

2. The combination of the bar C, the roller C', mounted thereon, and means substantially as shown and described, for holding the roller in place.

3. The combination of the bar C, the roller C', the rings c, c, and the straps S, S; substantially as shown and described.

FRANK LOHR.

Witnesses:
 R. H. WILES,
 J. H. STEARNS.